US007706962B2

(12) United States Patent
Fushiki et al.

(10) Patent No.: US 7,706,962 B2
(45) Date of Patent: Apr. 27, 2010

(54) DIAGNOSIS DEVICE FOR ELECTROMAGNETIC RELIEF VALVE IN FUEL DELIVERY DEVICE

(75) Inventors: Shunsuke Fushiki, Susono (JP); Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 316 days.

(21) Appl. No.: 11/988,212

(22) PCT Filed: Jun. 29, 2006

(86) PCT No.: PCT/JP2006/312991

§ 371 (c)(1),
(2), (4) Date: Jan. 3, 2008

(87) PCT Pub. No.: WO2007/007558

PCT Pub. Date: Jan. 18, 2007

(65) Prior Publication Data

US 2009/0240417 A1 Sep. 24, 2009

(30) Foreign Application Priority Data

Jul. 13, 2005 (JP) ............................ 2005-204646

(51) Int. Cl.
*G06F 19/00* (2006.01)
*F02B 7/00* (2006.01)

(52) U.S. Cl. ....................... 701/114; 701/107; 123/431; 73/114.38; 73/114.43

(58) Field of Classification Search ................. 701/103, 701/107, 114; 123/431, 479, 690; 73/114.38, 73/114.43, 114.45
See application file for complete search history.

(56) References Cited

U.S. PATENT DOCUMENTS 5,537,980 A 7/1996 Yamamoto
5,996,400 A * 12/1999 Nishioka et al. ......... 73/40.5 R (Continued)

FOREIGN PATENT DOCUMENTS

EP 1 529 940 A2 5/2005

(Continued)

OTHER PUBLICATIONS

Japanese Office Action issued in Japanese Application Patent No. 2005-204646 on Nov. 24, 2009. (with English translation).

*Primary Examiner*—John T Kwon
(74) *Attorney, Agent, or Firm*—Oliff & Berridge, PLC

(57) ABSTRACT

A fuel delivery device 11 has a delivery pipe 18, which supplies fuel to a fuel injection valve 21 of an internal combustion engine 10. An electromagnetic relief valve 22 releases the fuel from the delivery pipe 18 in response to an opening instruction and lowers the pressure of the fuel in the delivery pipe 18. A diagnosis device for the relief valve 22 has an electronic control unit 27 outputting the opening instruction to the relief valve 22 in response to a stopping instruction for stopping the engine 10. The unit 27 determines whether the relief valve 22 has a defect based on a manner in which the pressure of the fuel in the delivery pipe 18 changes after output of the stopping instruction. As a result, it is appropriately diagnosed whether the electromagnetic relief valve 22 has a defect.

14 Claims, 6 Drawing Sheets

U.S. PATENT DOCUMENTS

| | | | | |
|---|---|---|---|---|
| 6,148,803 | A * | 11/2000 | Majima et al. | 123/520 |
| 6,959,697 | B2 | 11/2005 | Kojima | |
| 7,107,968 | B2 * | 9/2006 | Nomura | 123/456 |
| 7,258,103 | B2 * | 8/2007 | Tahara et al. | 123/431 |
| 2007/0017483 | A1 * | 1/2007 | Tahara et al. | 123/431 |

FOREIGN PATENT DOCUMENTS

| | | |
|---|---|---|
| JP | A 07-158536 | 6/1995 |
| JP | A 2002-256943 | 9/2002 |
| JP | A 2003-083190 | 3/2003 |
| JP | A 2003-097374 | 4/2003 |
| JP | A-2005-133650 | 5/2005 |
| JP | A 2005-139975 | 6/2005 |

* cited by examiner

DIAGNOSIS DEVICE FOR ELECTROMAGNETIC RELIEF VALVE IN FUEL DELIVERY DEVICE

FIELD OF THE INVENTION

The present invention relates to a device that diagnoses the operating state of an electromagnetic relief valve used in a fuel delivery device supplying fuel to a fuel injection valve.

BACKGROUND OF THE INVENTION

A vehicle includes a fuel delivery device that draws fuel from a fuel tank under pressure through a fuel pump and sends the fuel to a delivery pipe. The fuel delivery device then distributes the fuel to fuel injection valves provided in respective cylinders of an internal combustion engine. The delivery pipe of the fuel delivery device has a relief valve that opens when the pressure of the fuel (the fuel pressure) in the delivery pipe exceeds a predetermined level. This releases the fuel and lowers the fuel pressure, which is excessively high.

Particularly, an in-cylinder injection type internal combustion engine, which injects high-pressure fuel directly into cylinders, employs as the relief valve an electromagnetic relief valve that selectively opens and closes in correspondence with the energization. The electromagnetic relief valve is maintained in an open state in a certain period after the engine stops. Specifically, if the fuel pressure is maintained at a high level after stopping of the engine, the fuel may leak from a fuel injection valve and deteriorate exhaust emission caused by subsequent starting of the engine. To avoid this problem, the electromagnetic relief valve is opened after the engine is stopped, as has been described, so that the fuel pressure in a delivery pipe decreases. This reduces the amount of the fuel leaking from the fuel injection valve and prevents deterioration of the exhaust emission.

However, if the electromagnetic relief valve of the aforementioned fuel delivery device is stuck and stops functioning normally, release of the fuel through the delivery pipe cannot be performed appropriately. To solve this problem, various techniques to diagnose the operating state of electromagnetic relief valves have been proposed conventionally.

For example, a diagnosis device described in Patent Document 1 determines the difference between the temperature of the fuel in the vicinity of a delivery pipe when a fuel bypass valve, which corresponds to the aforementioned electromagnetic relief valve, is closed and the temperature of the fuel in a fuel return passage in the vicinity of the fuel bypass valve. The diagnosis device determines that the fuel bypass valve is stuck in an open state if the difference is not greater than a predetermined value. Specifically, if the fuel bypass valve is stuck in the open state, the fuel gradually flows into the fuel bypass valve after having been heated by the internal combustion engine in the vicinity of the delivery pipe. This raises the temperature of the fuel in the vicinity of the fuel bypass valve to a value approximate to the fuel temperature in the vicinity of the delivery pipe (the difference between the fuel temperature in the vicinity of the fuel bypass valve and the fuel temperature in the vicinity of the delivery pipe decreases).

However, the target of diagnosis by the diagnosis device described in Patent Document 1 is an electromagnetic relief valve that opens when the internal combustion engine is started and is maintained in a closed state when the engine operates in a normal operating state, but not the above-described electromagnetic relief valve, which is maintained in a closed state when the engine operates in a normal operating state and opens when the engine stops. It is thus desirable to provide a diagnosis device suitable for diagnosis of the electromagnetic relief valve, which is operated to open after the engine is stopped.

Patent Document 1: Japanese Patent Laid-Open Publication No. 2003-97374

SUMMARY OF THE INVENTION

Accordingly, it is an objective of the present invention to provide a diagnosis device that appropriately determines whether there is a defect in an electromagnetic relief valve of a fuel delivery device that becomes open after stopping of an internal combustion engine.

To achieve the foregoing objective, the present invention provides a diagnosis device for an electromagnetic relief valve in a fuel delivery device of an internal combustion engine. The fuel delivery device has a high-pressure fuel passage through which a fuel is supplied to a fuel injection valve of the engine. The relief valve lowers a fuel pressure in the passage by releasing the fuel from the passage in response to an opening instruction. The diagnosis device has a control section that outputs the opening instruction to the relief valve in response to a stopping instruction for stopping the engine. The control section determines whether the relief valve has a defect based on a manner in which the fuel pressure in the passage changes after output of the stopping instruction.

The present invention provides another diagnosis device for an electromagnetic relief valve. The fuel delivery device has a high-pressure fuel passage through which a fuel is supplied to a fuel injection valve of the engine. The relief valve lowers a fuel pressure in the passage by releasing the fuel from the passage in response to an opening instruction. The relief valve stops releasing the fuel in response to a closing instruction. The diagnosis device has a control section that outputs a closing instruction to the relief valve in starting of the engine and operates in such a manner that the fuel pressure in the passage becomes a target value. The control section determines whether the relief valve has a defect based on the difference between an actual fuel pressure and the target value.

Further, the present invention provides a diagnosis method for an electromagnetic relief valve. The method includes: supplying fuel to a fuel injection valve of an internal combustion engine through a high-pressure fuel passage; causing the electromagnetic relief valve to release the fuel from the passage in response to an opening instruction so as to lower a fuel pressure in the passage; outputting the opening instruction to the relief valve in response to a stopping instruction for stopping the engine; and determining whether the relief valve has a defect based on a manner in which the fuel pressure in the passage changes after output of the stopping instruction.

The present invention provides another diagnosis method for an electromagnetic relief valve. The method provides: supplying fuel to a fuel injection valve of an internal combustion engine through a high-pressure fuel passage; causing the electromagnetic relief valve to release the fuel through the passage in response to an opening instruction so as to lower a fuel pressure in the passage; causing the relief valve to stop releasing the fuel in response to a closing instruction; outputting the closing instruction to the relief valve in starting of the engine and performing control for adjusting the fuel pressure in the passage to a target value; and determining whether the relief valve has a defect based on the difference between an actual fuel pressure and the target value.

DETAILED DESCRIPTION OF THE PREFERRED EMBODIMENTS

First Embodiment

A first embodiment of the present invention will now be described with reference to FIGS. 1 to 3.

A vehicle has an in-cylinder type internal combustion engine, which injects fuel from fuel injection valves directly into cylinders. The vehicle also includes a fuel delivery device that supplies fuel from a fuel tank to the fuel injection valves.

Figure 1:
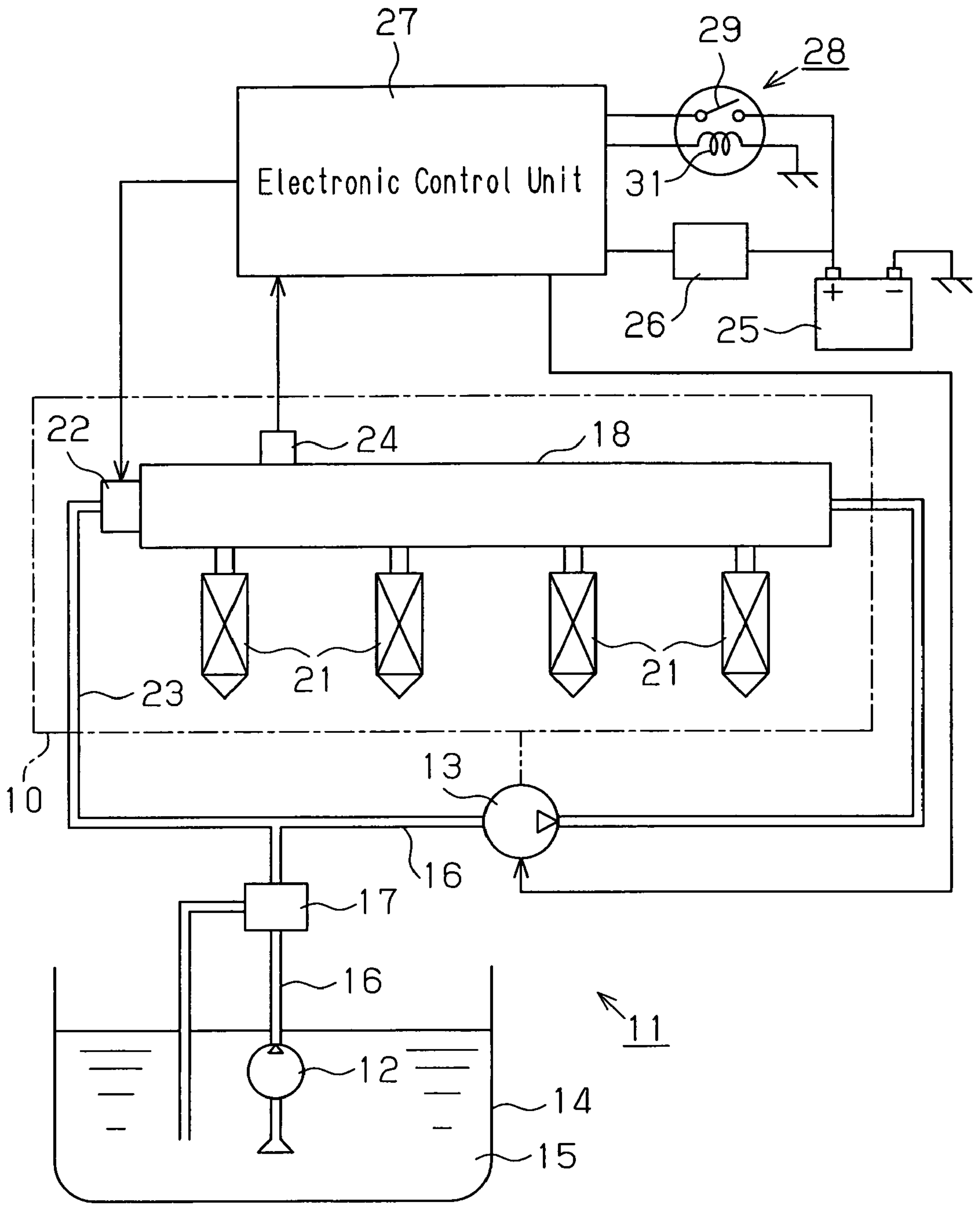
FIG. 1 is a schematic view showing a fuel delivery device and a diagnosis device for an electromagnetic relief valve according to a first embodiment of the present invention.
Figure 2:
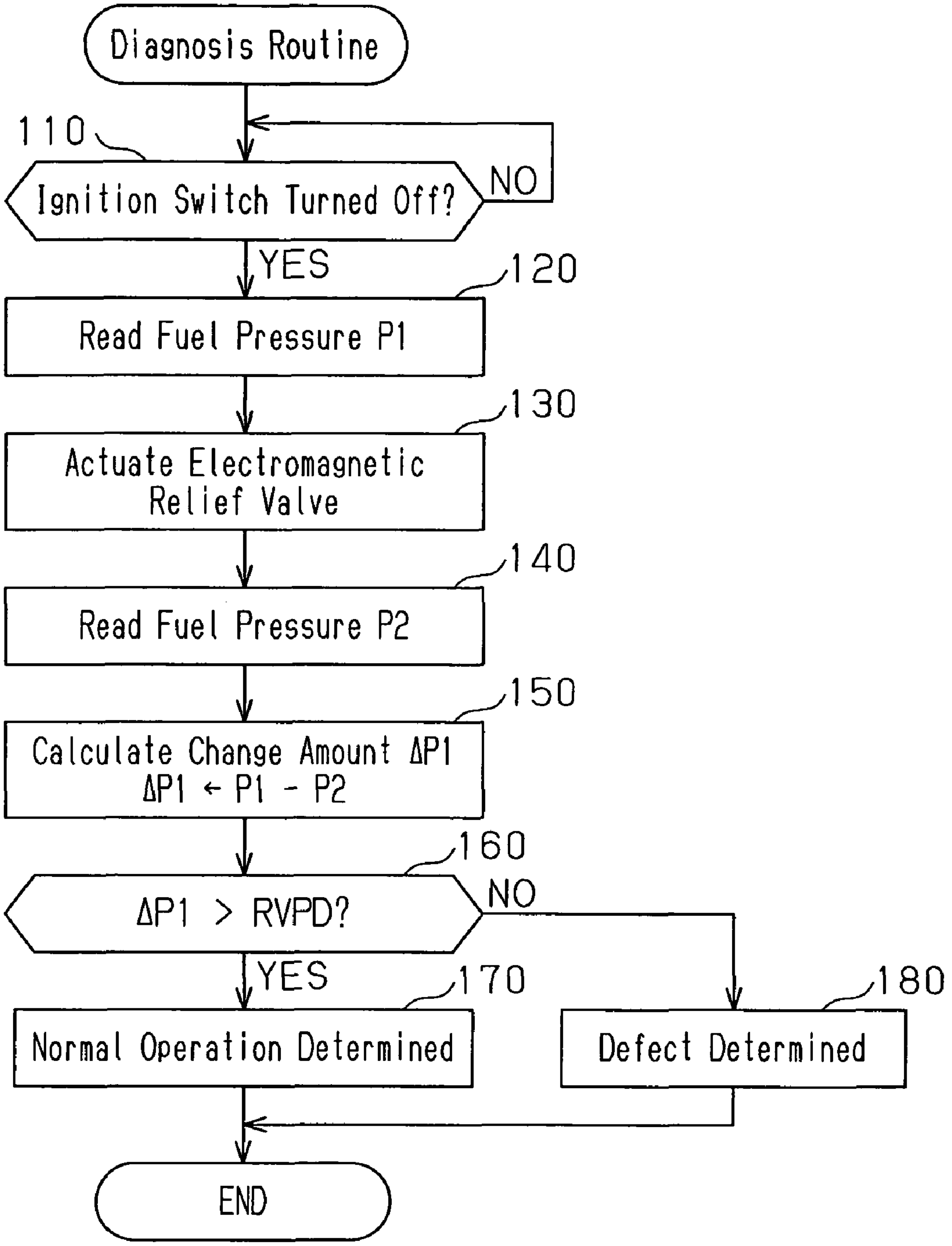
FIG. 2 is a flowchart representing a diagnosis routine executed by an electronic control unit;.

As shown in FIG. 1, a fuel delivery device 11 has a low-pressure pump 12 and a high-pressure pump 13. The low-pressure pump 12 is an electric pump fixed to the inner side of a fuel tank 14. The low-pressure pump 12 draws fuel 15 from the fuel tank 14 and discharges the fuel 15. The fuel 15 is then sent to the high-pressure pump 13 under pressure through a low-pressure fuel passage 16. A pressure regulator 17 that adjusts the pressure of the fuel 15 (the fuel pressure) in the low-pressure fuel passage 16 to a value not greater than a predetermined value is provided in the low-pressure fuel passage 16. The high-pressure pump 13 is operably connected to an internal combustion engine 10 and operates when the internal combustion engine 10 runs. The high-pressure pump 13 thus draws and pressurizes the fuel 15 that has been sent from the low-pressure pump 12 to the high-pressure pump 13 through the low-pressure fuel passage 16. Specifically, an electromagnetic valve is closed at an optimal timing when the fuel 15 is pressurized (and supplied) in such a manner that the high-pressure pump 13 discharges a necessary amount of the fuel 15. The fuel 15, the pressure of which is high, is then supplied to a high-pressure fuel passage formed by a delivery pipe 18 or the like. The delivery pipe 18 is connected to fuel injection valves 21, which are provided in correspondence with cylinders. The delivery pipe 18 thus distributes the fuel 15, which has been sent from the high-pressure pump 13, to the fuel injection valves 21.

An electromagnetic relief valve 22, which releases the fuel 15 from the delivery pipe 18 and lowers the fuel pressure, is arranged in the delivery pipe 18. The electromagnetic relief valve 22 is connected to the low-pressure fuel passage 16 through a return passage 23. The electromagnetic relief valve 22 is an electromagnetic valve and is selectively opened and closed through energization of an electromagnetic solenoid. Through opening of the electromagnetic relief valve 22, the fuel 15 in the delivery pipe 18 under high pressure is released into the low-pressure fuel passage 16. The delivery pipe 18 includes a fuel pressure sensor 24 that detects fuel pressure P in the delivery pipe 18.

A battery 25 is mounted in the vehicle as a power source for various electric devices. Supply of the power from the battery 25 to the electric devices is selectively permitted and stopped through manipulation of an ignition switch 26 by the driver. As is commonly known, the ignition switch 26 is operable between an ON position and an OFF position, and between the ON position and a START position. Basically, the power supply to the electric device is permitted when the ignition switch 26 is maintained at the ON position. Such supply is cut when the ignition switch 26 is switched to the OFF position. When the ignition switch 26 is manipulated to the START position, the starter is actuated and the rotational force is applied to the internal combustion engine 10.

An electronic control unit 27 is provided in the vehicle and controls the operations of the internal combustion engine 10 and the like based on signals provided by various sensors such as the fuel pressure sensor 24. The electronic control unit 27 is connected to the battery 25 through a main relay 28 and the ignition switch 26. The main relay 28 has a contact 29 and an excitation coil 31, which operates to selectively open and close the contact 29.

The electronic control unit 27, or a control section, is formed mainly by a microcomputer. In the electronic control unit 27, a central processing unit (CPU) performs calculations based on detection values of the sensors such as the fuel pressure sensor 24 and in accordance with control programs and initial data stored in a read-only memory (ROM). The CPU executes various control procedures based on the results of the computations. The results obtained through computation by the CPU are temporarily stored in a random access memory (RAM).

The control procedures include control procedures for the operations of the main relay 28, the high-pressure pump 13, and the electromagnetic relief valve 22.

In the control of operation of the main relay 28, the electronic control unit 27 excites the excitation coil 31 of the main relay 28 if the ignition switch 26 is held at the ON position. This closes the contact 29 (actuates the main relay 28) and the power is supplied from the battery 25 to the electronic control unit 27. If the ignition switch 26 is switched from the ON position to the OFF position, the excitation coil 31 is de-excited after a prescribed condition is met. Specifically, such switching of the ignition switch 26 to the OFF position corresponds to a stopping instruction of the internal combustion engine 10.

The prescribed condition herein is that a predetermined time elapses after the ignition switch 26 is manipulated to the OFF position. The time that elapses after such switching of the ignition switch 26 to the OFF position is measured by, for example, a post-OFF power-ON counter C1, which is represented in FIG. 3. The counter C1 starts counting when the ignition switch 26 is changed from the ON position to the OFF position (see time t1 in FIG. 3) and counts up each time a constant time elapses. When the count value of the post-OFF power-ON counter C1 reaches a predetermined value α (see time t5 in FIG. 3), it is indicated that the predetermined time has elapsed since switching of the ignition switch 26 to the OFF position. Thus, the excitation coil 31 is de-excited.

The predetermined value α is set as a count value of the post-OFF power-ON counter C1 after completion of opening of the electromagnetic relief valve 22.

Even after the ignition switch 26 is turned off, the power is supplied to the electronic control unit 27 through operation of the main relay 28 continuously for a certain duration of time (until the count value reaches the predetermined value α). When the count value reaches the value α (see time t5 in FIG. 3), the contact 29 is opened (the main relay 28 is deactivated) and the power supply from the battery 25 to the electronic control unit 27 is stopped. In this manner, the electronic control unit 27 controls the operation of the main relay 28 in accordance with manipulation of the ignition switch 26 in such a manner as to adjust the power supply to the electronic control unit 27.

In control of operation of the high-pressure pump 13, the electronic control unit 27 adjusts the displacement (the amount of pumped fuel) of the high-pressure pump 13 in such a manner that the fuel pressure P in the delivery pipe 18, or the injection pressure of the fuel 15 injected by the fuel injection valves 21, becomes a value suitable for the operating state of the internal combustion engine 10.

The fuel pressure P in the delivery pipe 18 is set to a high level compared to a case of a suction port injection type internal combustion engine. Specifically, the in-cylinder injection type internal combustion engine 10 needs to inject the fuel 15 against the high pressure in each cylinder and spray the fuel in an appropriately atomized form in order to ensure effective combustion.

In the control of the operation of the high-pressure pump 13, the electronic control unit 27 calculates a target value of the fuel pressure P in the delivery pipe 18 (hereinafter, referred to as a target fuel pressure Pt) based on the operating state of the internal combustion engine 10. Then, through the adjustment of the closing timings of the above-described electromagnetic valve, the electronic control unit 27 adjusts the fuel displacement in such a manner that the fuel pressure P in the delivery pipe 18, which is detected by the fuel pressure sensor 24, approximates to the target fuel pressure Pt.

In the control of the electromagnetic relief valve 22, the electronic control unit 27 outputs a closing instruction that instructs closing of the electromagnetic relief valve 22, when the internal combustion engine 10 is operated with the ignition switch 26 held at the ON position. In response to the closing instruction, the energization of the electromagnetic relief valve 22 is adjusted in such a manner that the electromagnetic relief valve 22 closes.

Contrastingly, immediately after the ignition switch 26 is switched to the OFF position so that the internal combustion engine 10 stops, an opening instruction is output and such output continues for a certain duration of time. In response to the opening instruction, the energization of the electromagnetic relief valve 22 is adjusted in such a manner that the electromagnetic relief valve 22 opens. This releases the fuel 15 from the delivery pipe 18 and decreases the fuel pressure P. Thus, the amount of the fuel 15 leaking from the fuel injection valves 21 after stopping of the engine is reduced. This suppresses deterioration of the exhaust emission, which would be caused by combustion of the leaked fuel in subsequent starting of the engine.

Figure 3:
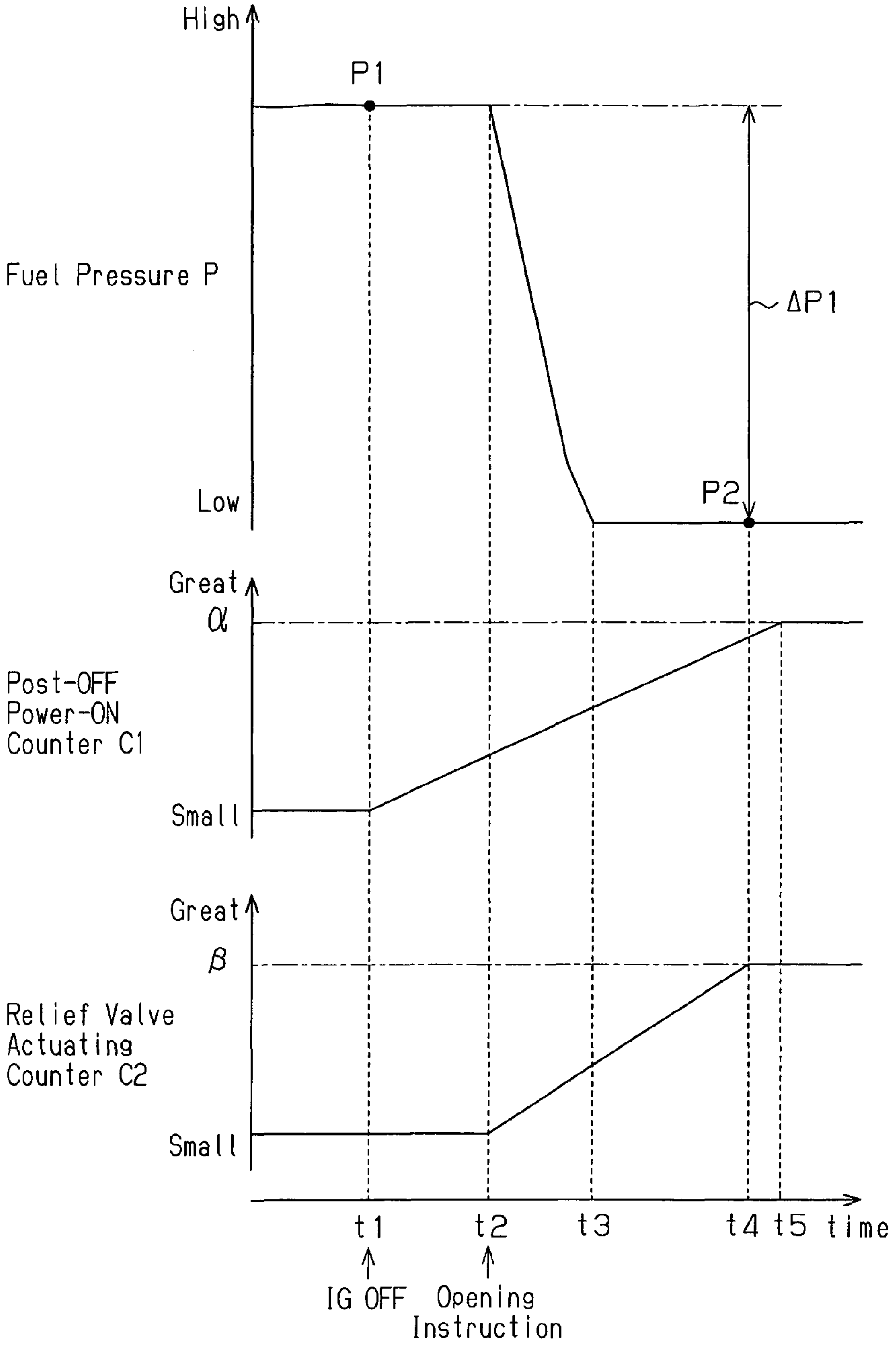
FIG. 3 is a timing chart representing changes of fuel pressure, a post-OFF power-ON counter, and a relief valve actuating counter.

The time that elapses after the start of output of the opening instruction is measured by, for example, a relief valve actuating counter C2, which is represented in FIG. 3. The counter C2 starts counting when output of the opening instruction is started (see time t2 in FIG. 3) and counts up each time a constant time elapses. When the count value of the relief valve actuating counter C2 reaches a predetermined value β (see time t4 in FIG. 3), it is indicated that a predetermined time has elapsed since the start of output of the opening instruction. Such output of the opening instruction is then suspended.

The predetermined value β is set to a value equally long with or slightly longer than the time needed for a normally functioning electromagnetic relief valve 22 to switch from a closed state to a fully open state in response to the opening instruction. Thus, when the count value of the relief valve actuating counter C2 reaches the value β, it is indicated that opening of the electromagnetic relief valve 22 has been completed.

The electronic control unit 27 then diagnoses the operating state of the electromagnetic relief valve 22. A procedure for carrying out such diagnosis will hereafter be explained with reference to a "diagnosis routine" represented in the flowchart of FIG. 2. The diagnosis routine is performed on the presumption that the fuel pressure sensor 24, the high-pressure pump 13, and the fuel system (including, for example, the fuel injection valves 21) all function normally.

First, in step 110, the electronic control unit 27 determines whether the ignition switch 26 has been manipulated from the ON position to the OFF position. Only if the condition of such determination is met, the electronic control unit 27 carries out step 120.

In step 120, the fuel pressure P in the delivery pipe 18, which is detected by the fuel pressure sensor 24, is read in if the following conditions A, B, C are all met. The fuel pressure p at this stage will be referred to as the "fuel pressure P1" in order to distinguish the value from the fuel pressure P at other stages.

Condition A: The internal combustion engine 10 has been stopped in response to turning off of the ignition switch 26.

Condition B: The power supply from the battery 25 to the electronic control unit 27 is continuously performed through operation of the main relay 28.

Condition C: The electromagnetic relief valve 22 is not yet open.

Thus, the fuel pressure P1, which is read in step 120, is a fuel pressure immediately before the electromagnetic relief valve 22 is actuated (when the electromagnetic relief valve 22 is held in a closed state). The same value is obtained as the fuel pressure P1 regardless of whether the electromagnetic relief valve 22 functions normally to open, or fails to function normally and maintains a fully closed state or stop in a half open state.

Subsequently, in step 130, an instruction signal (an opening instruction) that instructs opening of the electromagnetic relief valve 22 is output. If the electromagnetic relief valve 22 operates normally in response to the opening instruction, the electromagnetic relief valve 22 opens and the fuel 15 in the delivery pipe 18 is released to the fuel tank 14. Such release greatly decreases the fuel pressure P in the delivery pipe 18 after actuation of the electromagnetic relief valve 22, compared to the fuel pressure P in the delivery pipe 18 before the actuation of the electromagnetic relief valve 22. Contrastingly, if the electromagnetic relief valve 22 is stuck in the closed state and thus fails to operate (open) normally in spite of the opening instruction, the release amount of the fuel 15 becomes small. Thus, the fuel pressure P in the delivery pipe 18 after the actuation of the electromagnetic relief valve 22 does not decrease compared to the aforementioned case in which the electromagnetic relief valve 22 operates normally.

As has been described, the change amount of the fuel pressure P, or a value indicating one aspect of change of the fuel pressure P before and after the actuation of the electromagnetic relief valve 22, becomes different depending on whether the electromagnetic relief valve 22 functions normally or not.

In this regard, in the first embodiment, the current value of the fuel pressure p in the delivery pipe 18, which is detected by the fuel pressure sensor 24, is read in step 140 if the following conditions D, E, F, G are all met. The fuel pressure P at this stage will be referred to as the "fuel pressure p2" in order to distinguish the value from the above-described fuel pressure P1.

Condition D: The internal combustion engine 10 is maintained in a stopped state.

Condition E: The ignition switch 26 is held at the OFF position.

Condition F: The power supply from the battery 25 to the electronic control unit 27 is maintained through operation of the main relay 28 after the ignition switch 26 has been manipulated to the OFF position.

Condition G: The actuation of the electromagnetic relief valve 22 has been completed.

Thus, the fuel pressure P2 obtained in step 140 corresponds to the value when or immediately after the actuation of the electromagnetic relief valve 22 is completed.

Next, in step 150, a change amount ΔP1 (=P1−P2) of the fuel pressure P2 obtained in step 140 with respect to the fuel pressure P1 determined in step 120 is calculated.

In step 160, it is determined whether the change amount ΔP1 (>0) is greater than a predetermined determination value RVPD. The determination value RVPD is set to a value smaller than the value of the change amount ΔP1 when the electromagnetic relief valve 22 functions normally to open in response to the opening instruction and greater than the value of the change amount ΔP1 when the electromagnetic relief valve 22 fails to function normally.

Based on the determination of step 160, it is determined whether the electromagnetic relief valve 22 functions normally or has a defect. If the condition of the determination of step 160 is met (ΔP1>RVPD), it is determined in step 170 that the electromagnetic relief valve 22 normally functions and is open. In contrast, if the condition of the determination of step 160 is not met (ΔP1≦RVPD), it is determined in step 180 that the electromagnetic relief valve 22 is stuck in a closed state and has a defect. After determination of steps 170, 180, a series of procedures involved in the diagnosis routine are suspended.

If the fuel pressure P in the delivery pipe 18 changes as illustrated in FIG. 3 by the electromagnetic relief valve 22 operating in correspondence with manipulation of the ignition switch 26, the procedures of the above-described diagnosis routine are performed as follows.

In the operation of the internal combustion engine 10, the ignition switch 26 is maintained at the ON position before the time t1 in FIG. 3 (step 110: NO). At this stage, the high pressure fuel 15 is supplied from the high-pressure pump 13 to the delivery pipe 18 and the electromagnetic relief valve 22 is held in a closed state. The fuel pressure P in the delivery pipe 18 is thus high. The count values of the post-OFF power-ON counter C1 and the relief valve actuating counter C2 are both initial values.

If the ignition switch 26 is manipulated by the driver from the ON position to the OFF position (step 110: YES), the current value of the fuel pressure P is read in as the fuel pressure P1 before actuation of the electromagnetic relief valve 22 (in step 120). At this stage, the internal combustion engine 10 is stopped and supply of the high-pressure fuel from the high-pressure pump 13 is stopped. However, since the electromagnetic relief valve 22 is not open yet, the fuel pressure P in the delivery pipe 18 is maintained at a high level. Further, in response to turning off of the ignition switch 26, the post-OFF power-ON counter C1 starts counting.

At time t2, or immediately after the ignition switch 26 is switched to the OFF position, the opening instruction is output (in step 130). At this stage, as long as the electromagnetic relief valve 22 functions normally, the electromagnetic relief valve 22 opens in response to the opening instruction. This releases the fuel 15 from the delivery pipe 18 and returns the fuel 15 to the fuel tank 14 through return passage 23 and the low-pressure fuel passage 16. Thus, following the time t2, the fuel pressure P in the delivery pipe 18 drops as the time elapses. The fuel pressure P reaches the minimum possible value at time t3 in FIG. 3 and remains unchanged afterwards.

In contrast, if the electromagnetic relief valve 22 is stuck in a closed state, for example, the electromagnetic relief valve 22 does not open in spite of the opening instruction, or opens in a limited manner by an amount less than the amount corresponding to the opening instruction. In these cases, the fuel pressure P decreases slowly or by a limited amount compared to the case in which the electromagnetic relief valve 22 functions normally.

In response to the opening instruction, the relief valve actuating counter C2 starts counting. The count value of the counter C2 increases after time t2. At time t4 at which the count value reaches the predetermined value β, the fuel pressure P is read in and defined as the fuel pressure P2 after actuation of the electromagnetic relief valve 22 (in step 140). At time t4, calculation of the change amount ΔP1 (step 150), comparison between the change amount ΔP1 and the determination value RVPD (step 160), and determination whether the electromagnetic relief valve 22 functions normally or has a defect (in steps 170, 180) are performed.

If the count value of the post-OFF power-ON counter C1 reaches the predetermined value α after time t4 (at time t5), the main relay 28 is deactivated and the power supply from the battery 25 to the electronic control unit 27 is stopped.

The first embodiment, which has been described in detail, has the following advantages.

(1) In response to the opening instruction, the change amount ΔP1 (>0) between the fuel pressure P1 before actuation of the electromagnetic relief valve 22 (turning off of the ignition switch 26) and the fuel pressure P2 after the actuation of the electromagnetic relief valve 22 is obtained. The change amount ΔP1 is compared with the determination value RVPD. If the change amount ΔP1 is less than the determination value RVPD, it is determined that the electromagnetic relief valve 22 has a defect. If the change amount ΔP1 is not less than the determination value RVPD, it is determined that the electromagnetic relief valve 22 functions normally. In other words, it is determined whether the electromagnetic relief valve 22 has a defect based on the manner in which the fuel pressure P changes after turning off of the ignition switch 26 (output of the stopping instruction of the internal combustion engine 10).

The value optimally set as the determination value RVPD is smaller than the change amount ΔP1 when the electromagnetic relief valve 22 functions normally and greater than the change value ΔP1 when the electromagnetic relief valve 22 does not operate normally. Using such a value, it is correctly determined whether the electromagnetic relief valve 22 has a defect.

(2) The electromagnetic relief valve 22 opens when the opening instruction is generated in response to turning off of the ignition switch 26 (the stopping instruction of the internal combustion engine 10). Thus, immediately after the ignition switch 26 is turned off, the electromagnetic relief valve 22 is maintained in a closed state. Accordingly, the fuel pressure P in the delivery pipe 18 at this point corresponds to the fuel pressure P1 immediately before the actuation of the electromagnetic relief valve 22.

In the first embodiment, the fuel pressure P in the delivery pipe 18 immediately after the ignition switch 26 is turned off (the stopping instruction is generated) is used as the fuel pressure P1 before the actuation of the electromagnetic relief valve 22 in determination of whether the electromagnetic relief valve 22 has a defect. The fuel pressure P1 before the actuation of the electromagnetic relief valve 22 is thus accurately acquired. As a result, the change amount ΔP1 of the fuel pressure P before and after the actuation of the electromagnetic relief valve 22 is accurately calculated.

(3) The electromagnetic relief valve 22 is actuated when the opening instruction is generated in response to the manipulation of the ignition switch 26 to the OFF position (the stopping instruction of the internal combustion engine 10). If the electromagnetic relief valve 22 functions normally, the electromagnetic relief valve 22 starts operating to be open in response to the opening instruction. Then, as time elapses, the electromagnetic relief valve 22 becomes increasingly open and reaches a fully open state, completing its operation.

In the first embodiment, the fuel pressure P when the predetermined time elapses after the start of output of the opening instruction (the relief valve actuating counter C2 reaches the predetermined value β) is used as the fuel pressure P2 after the actuation of the electromagnetic relief valve 22. Thus, the fuel pressure after completion of the actuation of the electromagnetic relief valve 22 is accurately acquired. As a result, the change ΔP1 of the fuel pressure P before and after the actuation of the electromagnetic relief valve 22 is accurately calculated.

(4) After the internal combustion engine 10 stops, the electromagnetic relief valve 22 operates to open and the fuel pressure P changes correspondingly. The fuel pressures P1, P2 before and after the actuation of the electromagnetic relief valve 22 are read in. The change amount ΔP1 between the fuel pressures P1, P2 is then compared with the determination value RVPD to determine whether the electromagnetic relief valve 22 has a defect. This makes it unnecessary to open or close the electromagnetic relief valve 22 particularly to carry out such determination.

(5) In the fuel delivery device 11, in which the electromagnetic relief valve 22 becomes open after the internal combustion engine 10 stops, the determination whether the electromagnetic relief valve 22 has a defect is carried out when the electromagnetic relief valve 22 is opening.

Second Embodiment

A second embodiment of the present invention will hereafter be explained with reference to FIGS. 4 and 5.

In the fuel delivery device 11 of the second embodiment, a closing instruction for closing the electromagnetic relief valve 22 is output when the internal combustion engine 10 is started. The fuel pressure P is adjusted to a target value (a constant value) continuously for a predetermined time after the start of the internal combustion engine 10 (such adjustment will hereafter be referred to as "post-starting fuel pressure control"). In the second embodiment, diagnosis is performed to determine whether the electromagnetic relief valve 22 of the fuel delivery device 11 has a defect. Like the first embodiment, the fuel delivery device 11 of the second embodiment generates an opening instruction in response to a stopping instruction of the internal combustion engine 10 and releases the fuel 15 from the delivery pipe 18, thus lowering the fuel pressure P.

The goal of the post-starting fuel pressure control is to stabilize the fuel pressure P, which has been decreased through the opening of the electromagnetic relief valve 22 in a deactivated state of the internal combustion engine 10, at an early stage after starting of the engine 10. Such control is performed as a control procedure of the operation of the above-described high-pressure pump 13 (see FIG. 5). Specifically, when the power is supplied from the battery 25 to the electronic control unit 27 in response to manipulation of the ignition switch 26 from the OFF position to the ON position, a constant value is calculated as a target fuel pressure Pt. After the internal combustion engine 10 is started, the fuel displacement is regulated through adjustment of the closing timings of the electromagnetic valve of the high-pressure pump 13 in such a manner that the fuel pressure P, which is detected by the fuel pressure sensor 24, approximates to the target fuel pressure Pt. Such post-starting fuel pressure control continues for a predetermined time after starting of the internal combustion engine 10.

In such control, if the electromagnetic relief valve 22 functions normally and closes in response to the closing instruction, the amount of the fuel 15 released from the delivery pipe 18 is small (or zero) and the fuel pressure P approximates to the target fuel pressure Pt. That is, the difference between the fuel pressure P and the target fuel pressure Pt is small.

Contrastingly, if the electromagnetic relief valve 22 is stuck in an open state, for example, and does not function normally and does not close in response to the closing instruction, the fuel 15 is released through the electromagnetic relief valve 22 and the difference between the fuel pressure P and the target fuel pressure Pt increases. Such difference is great compared to the case in which the electromagnetic relief valve 22 functions normally. In other words, the difference between the fuel pressure P and the target fuel pressure Pt varies depending on whether the electromagnetic relief valve 22 functions normally.

Figure 4:
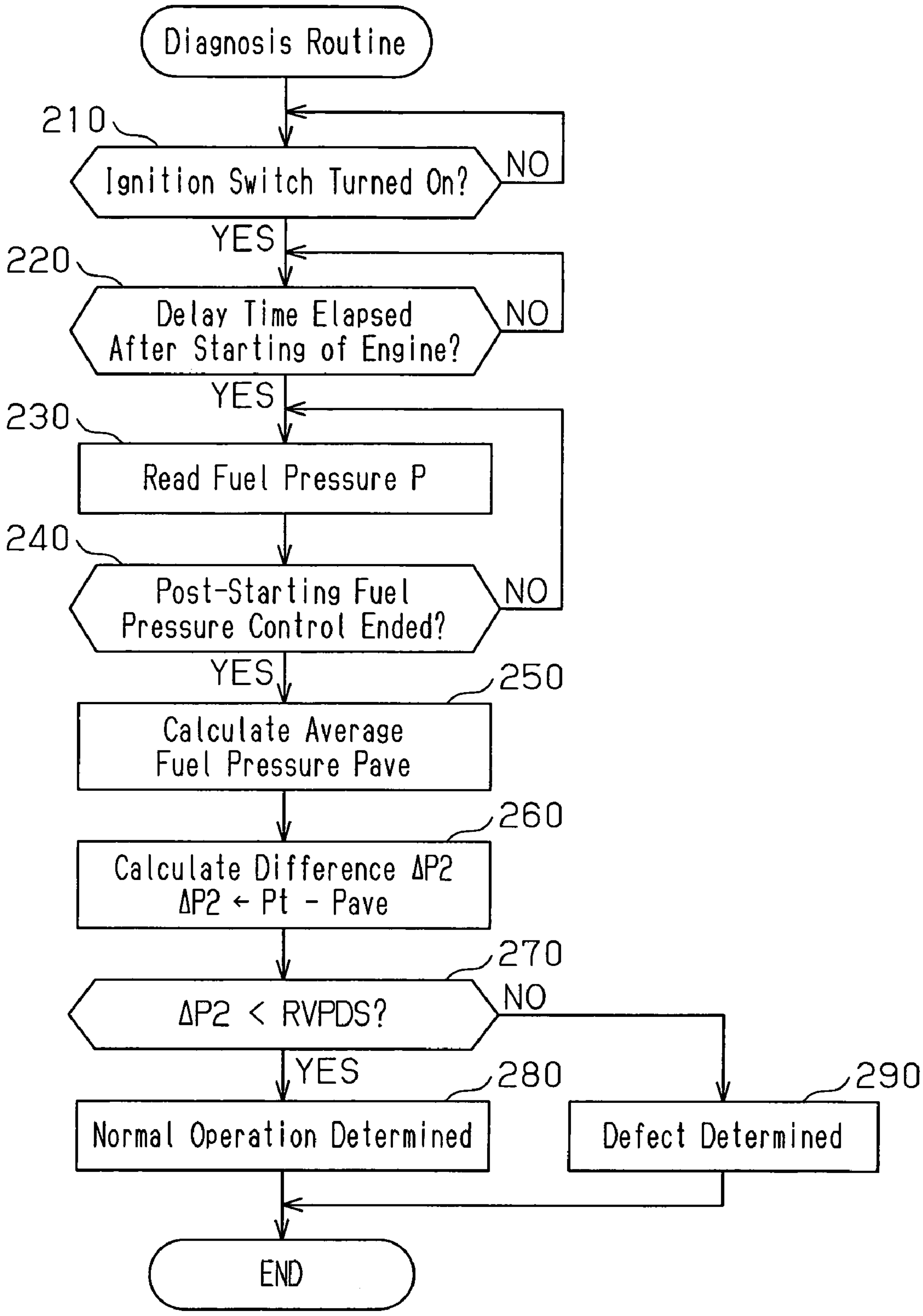
FIG. 4 is a flowchart representing a diagnosis routine executed by an electronic control unit according to a second embodiment of the present invention.

Taking this phenomenon into consideration, in the second embodiment, the operating state of the electromagnetic relief valve 22 is diagnosed in accordance with a "diagnosis routine" represented by the flowchart of FIG. 4. Like the first embodiment, the diagnosis routine is performed on the presumption that the fuel pressure sensor 24, the high-pressure pump 13, and the fuel system all function normally.

In step 210, the electronic control unit 27 determines whether the ignition switch 26 has been switched to the ON position. Only if the condition of such determination is met, the electronic control unit 27 performs step 220.

If the ignition switch 26 has been manipulated to the ON position, the target fuel pressure Pt of the above-described post-starting fuel pressure control is calculated.

In step 220, it is determined whether the internal combustion engine 10 has been started and a predetermined delay time Td has elapsed since the starting of the engine 10. The determination whether the internal combustion engine 10 has been started may be carried out in accordance with, for example, the engine speed or the fuel pressure P. As has been described, after starting of the internal combustion engine 10, the post-starting fuel pressure control is initiated and continued for a predetermined time so that the fuel pressure P reaches the aforementioned constant target fuel pressure Pt. The post-starting fuel pressure control causes a period in which the fuel pressure P greatly changes after the starting of the engine 10 (see FIG. 5). The delay time Td is set to a value slightly greater than the duration of the period in which the fuel pressure P changes, which will be explained later. The electronic control unit 27 performs step 230, or a subsequent step, only if the condition of determination of step 220 is met.

In step 230, the current value of the fuel pressure P in the delivery pipe 18, which is detected by the fuel pressure sensor 24, is read in if the following conditions H, I, J are all met.

Condition H: The internal combustion engine 10 is in operation.

Condition I: A closing instruction has been output.

Condition J: The fuel 15 is being injected from the fuel injection valves 21.

Subsequently, in step 240, it is determined whether the post-starting fuel pressure control has been ended. If the condition of such determination is not met, step 230 is repeated. If the condition is met, step 250 is carried out. That is, the procedure of reading in the fuel pressure P (step 230) may be repeatedly performed during the period in which the post-starting fuel pressure control is conducted, except for the delay period Td. In step 250, an average fuel pressure Pave, which is an arithmetic average of the values of the fuel pressure P that have been read in step 230, is calculated.

Next, in step 260, a difference ΔP2 (=Pt−Pave) between the average fuel pressure Pave obtained in step 250 and the target fuel pressure Pt used in the post-starting fuel pressure control is calculated.

In step 270, it is determined whether the difference ΔP2 is smaller than a predetermined determination value RVPDS. The determination value RVPDS is greater than the difference ΔP2 when the electromagnetic relief valve 22 functions normally and closes in response to the closing instruction and smaller than the difference ΔP2 when the electromagnetic relief valve 22 does not function normally.

Based on the determination of step 270, it is determined whether the electromagnetic relief valve 22 functions normally or has a defect. If the condition of determination of step 270 is met (ΔP2<RVPDS), it is determined in step 280 that the electromagnetic relief valve 22 functions normally and is closed. Contrastingly, if the condition of determination of step 270 is not met (ΔP2≧RVPDS), it is determined in step 290 that the electromagnetic relief valve 22 is stuck in an open state, or has a defect. After the determinations of steps 280, 290, a series of procedures involved in the diagnosis routine are ended.

Figure 5:
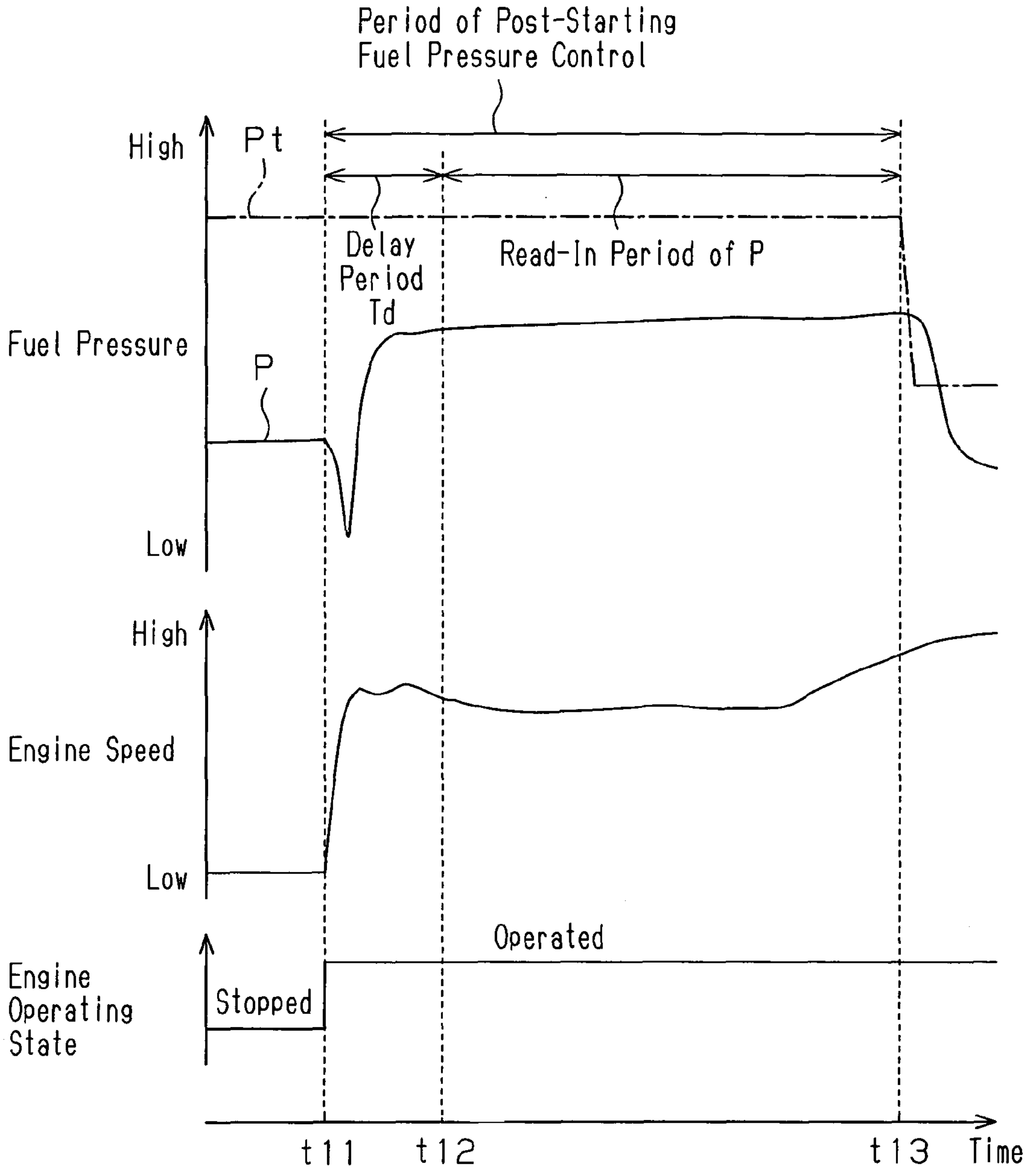
FIG. 5 is a timing chart representing changes of fuel pressure, the engine speed, and the state of the engine.

If the fuel pressure P in the delivery pipe 18 is varied as illustrated in FIG. 5 through the operation of the electromagnetic relief valve 22 in response to manipulation of the ignition switch 26, the procedures corresponding to the diagnosis routine are performed in the following manner.

Before time t11 in FIG. 5, the internal combustion engine 10 is held in a stopped state and the ignition switch 26 is held at the ON position (step 210: YES). In this period, the power is supplied from the battery 25 to the electronic control unit 27 and the target fuel pressure Pt (a constant value) for the post-starting fuel pressure control is calculated.

At time t11, when the internal combustion engine 10 is started through manipulation of the ignition switch 26 to the START position, the engine speed starts to rise. Further, the internal combustion engine 10 activates the high-pressure pump 13 so that the high-pressure pump 13 starts to draw and pressurize the fuel 15. Also, the control of the operation of the high-pressure pump 13 is started so that the fuel pressure P becomes the target fuel pressure Pt of the post-starting fuel pressure control. Specifically, the high-pressure pump 13 discharges the fuel 15 and the fuel 15 is distributed to the fuel injection valves 21 through the delivery pipe 18 and injected into the combustion chambers. After the internal combustion engine 10 has been started and injection of the fuel 15 has been resumed, there is a period in which the fuel pressure P greatly changes. As indicated in FIG. 5, the fuel pressure P drops immediately after starting of the engine 10 and increases quickly afterward. Specifically, immediately after starting of the engine 10, the engine speed remains small and the pressure of the fuel 15, which is pressurized by the high-pressure pump 13, remains low. Under such circumstances, a relatively great amount of the fuel 15 is injected to start the engine 10, which causes the aforementioned drop of the fuel pressure P. Afterward, the engine speed increases and the pressure of the fuel 15, which is pressurized by the high-pressure pump 13, rises. Also, a great amount of fuel 15 is discharged from the high-pressure pump 13 through the post-starting fuel pressure control in such a manner that the fuel pressure P approximates to the target fuel pressure Pt. This causes the illustrated quick rise of the fuel pressure P. After the period in which the fuel pressure P changes greatly, the change amount of the fuel pressure P is maintained small (the fuel pressure P is maintained stable) until the post-starting fuel pressure control is ended (at time t13).

When the change amount of the fuel pressure P is small, as has been described, the relationship between the fuel pressure P and the target fuel pressure Pt changes depending on whether the electromagnetic relief valve 22 functions normally (closes) or does not function normally (remains open to a certain extent). If the electromagnetic relief valve 22 functions normally, the amount of the fuel 15 released through the electromagnetic relief valve 22 is small. Thus, the fuel pressure P becomes a value approximate to the target fuel pressure Pt (the difference between the fuel pressure P and the target fuel pressure P: small). In contrast, if the electromagnetic relief valve 22 does not function normally and remains open to a certain extent, the fuel 15 is released through the electromagnetic relief valve 22 regardless of increase in the displacement of the fuel 15 from the high-pressure pump 13. This prevents the fuel pressure P in the delivery pipe 18 from approximating to the target fuel pressure Pt (the difference between the fuel pressure P and the target fuel pressure Pt: great). Specifically, the fuel pressure P becomes smaller than the target fuel pressure Pt by a great margin if the electromagnetic relief valve 22 is stuck in a greatly open state, compared to a case in which the electromagnetic relief valve 22 is stuck in a slightly open state.

At time 12 at which the delay time Td, which is set in consideration of the period in which the fuel pressure P greatly changes, elapses after time t11 (step 220: YES), a procedure of reading in the fuel pressure P (step 230) is started. The procedure is repeatedly performed throughout the period in which the post-starting fuel pressure control is performed (from time t12 to time t13).

When the post-starting fuel pressure control is ended at time t13 (step 240: YES), the average fuel pressure Pave is calculated based on values of the fuel pressure P that have been read in (in step 250). Further, calculation of the difference ΔP2 (step 260), comparison between the difference ΔP2 and the determination value RVPDS step 270), and determination of whether the electromagnetic relief valve 22 functions normally or has a defect based on the comparison (steps 280, 290) are carried out.

After time t13, at which the post-starting fuel pressure control is ended, the target fuel pressure Pt corresponding to the current operating state of the internal combustion engine 10 is calculated. The closing timings of the electromagnetic valve of the high-pressure pump 13 are thus adjusted to regulate the fuel displacement in such a manner that the fuel pressure P approximates to the target fuel pressure Pt. In FIG. 5, a value smaller than the target fuel pressure Pt in the post-starting fuel pressure control is obtained as the target fuel pressure Pt. Through such control of operation of the high-pressure pump 13, the fuel pressure P is changed (decreased).

The second embodiment, which has been described in detail, has the following advantages.

(6) The fuel delivery device 11 generates the closing instruction for closing the electromagnetic relief valve 22 when the internal combustion engine 10 is started and performs the post-starting fuel pressure control so that the fuel pressure P reaches the constant target fuel pressure Pt. In the fuel delivery device 11, the difference ΔP2 between the target fuel pressure Pt and the fuel pressure P (the average fuel pressure Pave) is determined and compared with the determination value RVPDS. If the difference ΔP2 is greater than the determination value RVPDS, it is determined that the electromagnetic relief valve 22 has a defect. If the difference ΔP2 is not greater than the determination value RVPDS, it is determined that the electromagnetic relief valve 22 functions normally.

The value optimally set as the determination value RVPDS is greater than the change amount ΔP2 when the electromagnetic relief valve 22 functions normally and smaller than the change value ΔP2 when the electromagnetic relief valve 22 has a defect. Using such a value, it is correctly determined whether the electromagnetic relief valve 22 has a defect.

(7) The fuel pressure P is read in at least a certain period of the post-starting fuel pressure control. The average (the average fuel pressure Pave) of the values of the fuel pressure P is used in determination whether the electromagnetic relief valve 22 has a defect. This improves accuracy of such determination, compared to a case in which the fuel pressure P is read in a specific period of the post-starting fuel pressure control and used in determination.

(8) In the post-starting fuel pressure control, a period after the period from when the internal combustion engine 10 is started to when the delay time Td elapses corresponds to the period in which the fuel pressure P is read in, as has been described in the advantage (7). Thus, although the fuel pressure P may change greatly immediately after starting of the internal combustion engine 10, the influence of such change on calculation of the average fuel pressure Pave is limited. As a result, the average fuel pressure Pave is calculated with improved accuracy.

(9) When the fuel pressure P is stabilized in the post-starting fuel pressure control, the difference ΔP2 between the fuel pressure P and the target fuel pressure Pt changes depending on the stuck state of the electromagnetic relief valve 22. The difference ΔP2 becomes great if the electromagnetic relief valve 22 is stuck in a greatly open state, compared to the case in which the electromagnetic relief valve 22 is stuck in a slightly open state. Thus, using the optimal value as the determination value RVPDS, not only whether the electromagnetic relief valve 22 has a defect but also the degree of the defect, which is, for example, whether the stuck state is caused in a fully open state or a half open state, are determined.

(10) A constant value is obtained as the target fuel pressure Pt in the post-starting fuel pressure control, which is performed in a certain duration of time immediately after the internal combustion engine 10 is started. The difference ΔP2 between the fuel pressure (the average fuel pressure Pave) and the target fuel pressure Pt is determined. The difference ΔP2 is then compared with the determination value RVPDS. Through such comparison, it is determined whether the electromagnetic relief valve 22 has a defect. This makes it unnecessary to open or close the electromagnetic relief valve 22 particularly to determine whether the electromagnetic relief valve 22 has a defect.

The present invention may be embodied in the following forms.

In the first embodiment, the time at which the fuel pressure P1 is read in may be set to a point in the period from when the ignition switch 26 is turned off to when the electromagnetic relief valve 22 starts operating. Thus, the time for reading in the fuel pressure P1 may be modified as desired, as long as it falls in this period.

In the first embodiment, the time at which the fuel pressure P2 is read in does not necessarily have to be after the electromagnetic relief valve 22 completes its operation. Specifically, the fuel pressure P changes (drops) when the electromagnetic relief valve 22 operates normally and opens to a certain extent in response to the opening instruction. Thus, the fuel pressure P2 may be read in, for example, after a predetermined time since output of the opening instruction.

In the post-starting fuel pressure control of the second embodiment, the end of the period in which the fuel pressure P is read in may be advanced to a time point before the end of the post-starting fuel pressure control. For example, the end of the period in which the fuel pressure P is read in may be set to a time point after a certain period of time following the delay time Td.

Determination of whether the electromagnetic relief valve 22 has a defect may be performed when the fuel pressure P is being adjusted to the target fuel pressure Pt (a variable value) in starting of the internal combustion engine 10 and based on the difference ΔP2 between the actual fuel pressure P and the target fuel pressure Pt, as in the second embodiment.

Figure 6:
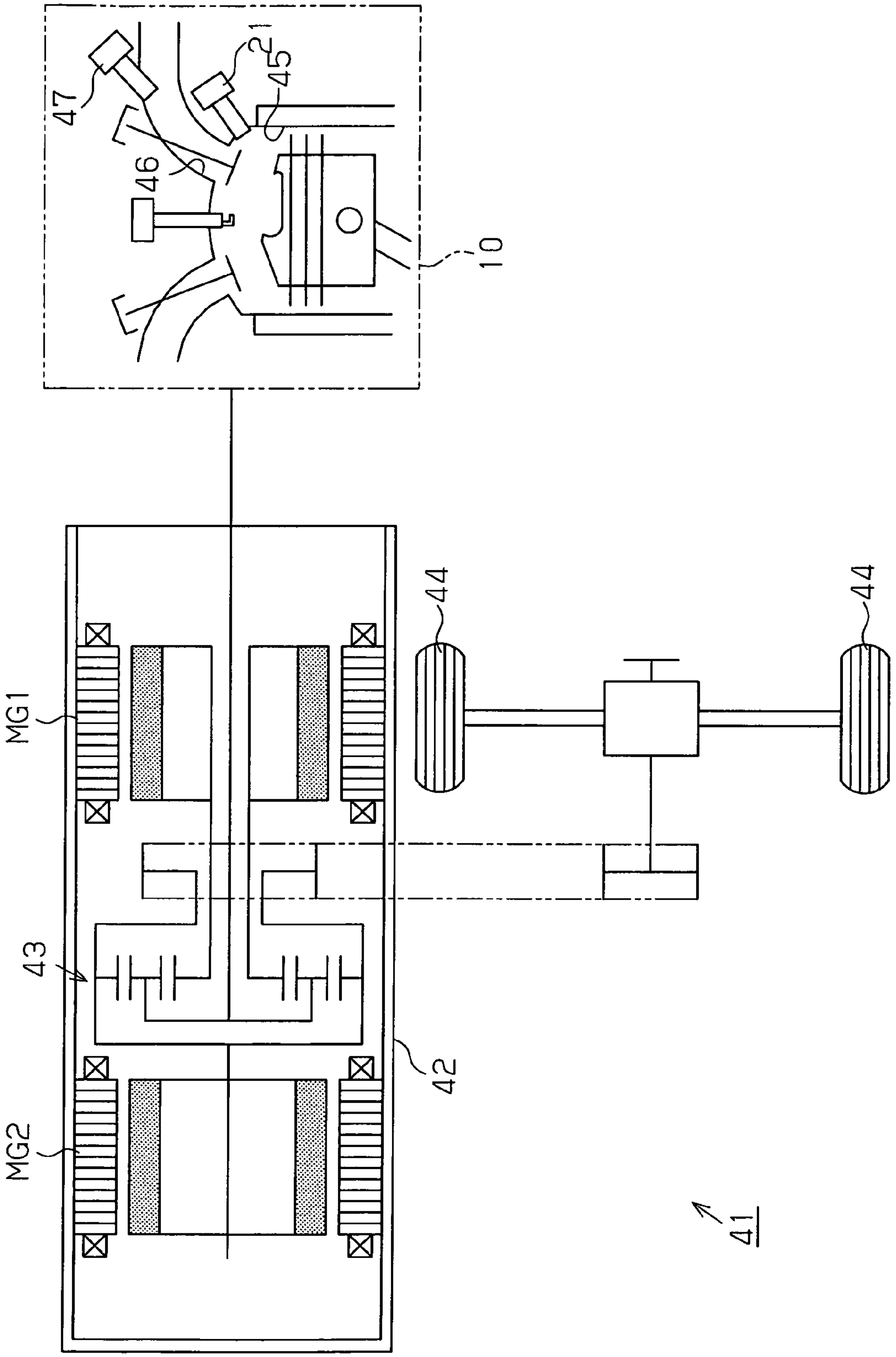
FIG. 6 is a schematic view showing a hybrid vehicle employing the diagnosis device for the electromagnetic relief valve.

The present invention may be embodied in a hybrid vehicle 41, which is shown in FIG. 6. The hybrid vehicle 41 employs two types of drive sources with different characteristics, which are an internal combustion engine and an electric motor. The hybrid vehicle 41 optimally combines the drive forces in correspondence with the circumstances.

A drive device 42 of the hybrid vehicle 41 has a first motor generator (MG1), a power dividing mechanism 43, and a second motor generator (MG2). The MG1 functions mainly as a power generator. The power dividing mechanism 43 is a planetary gear mechanism and divides the power generated by the internal combustion engine 10 to the power for driving the MG1 and the power for driving drive wheels 44. The MG2 functions mainly as an electric motor and produces assisting power that drives the drive wheels 44, separately from the power of the internal combustion engine 10. In the drive device 42, one of the powers divided by the power dividing mechanism 43 is mechanically transmitted to the drive wheels 44 to rotate the drive wheels 44. The other of the divided powers is transmitted to MG1. This causes MG1 to function as the power generator and the power generated by MG1 is supplied to MG2. MG2 thus functions as the electric motor and the drive force generated by MG2 is added to the corresponding one of the powers divided by the power dividing mechanism 43, assisting outputting of the internal combustion engine 10.

If the hybrid vehicle 41 is designed to be capable of traveling only using the electric motor, the internal combustion engine 10 may be turned off when the hybrid vehicle 41 is traveling. The present invention can be applied to this case.

Alternatively, the internal combustion engine 10 may include a fuel injection valve 47 that injects fuel into an intake port 46, in addition to the fuel injection valves 21, which inject the fuel directly into the cylinders 45.

The invention claimed is:

1. A diagnosis device for an electromagnetic relief valve in a fuel delivery device of an internal combustion engine, the fuel delivery device having a high-pressure fuel passage through which a fuel is supplied to a fuel injection valve of the engine, the relief valve lowering a fuel pressure in the passage by releasing the fuel from the passage in response to an opening instruction, the diagnosis device wherein a control section that outputs the opening instruction to the relief valve in response to a stopping instruction for stopping the engine, the control section determining whether the relief valve has a defect based on a change amount of the fuel pressure before and after the relief valve is actuated in response to the opening instruction.

2. The diagnosis device according to claim 1, wherein the determination by the control section involves the use of the fuel pressure when the stopping instruction is output as the fuel pressure before the actuation of the relief valve.

3. The diagnosis device according to claim l, wherein the determination by the control section involves the use of the fuel pressure from when the opening instruction is output to when a predetermined time elapses as the fuel pressure after the operation of the relief valve.

4. The diagnosis device according to claim 3, wherein the predetermined time is a period equal to or slightly longer than a duration of time needed for a normally functioning electromagnetic relief valve to switch from a closed state to a fully open state in response to the opening instruction.

5. The diagnosis device according to claim l, wherein the control section determines that the relief valve has a defect if the change amount is less than a predetermined determination value.

6. The diagnosis device according to claim 5, wherein the predetermined determination value is smaller than the change amount of the fuel pressure at the time when the relief valve opens in response to the opening instruction, and is greater than the change amount of the fuel pressure at the time when the relief valve does not open in spite of the opening instruction.

7. A diagnosis device for an electromagnetic relief valve in a fuel delivery device of an internal combustion engine, the fuel delivery device having a high-pressure fuel passage through which a fuel is supplied to a fuel injection valve of the engine, the relief valve lowering a fuel pressure in the passage by releasing the fuel from the passage in response to an opening instruction, the relief valve stopping releasing the fuel in response to a closing instruction, the diagnosis device including a control section that outputs a closing instruction to the relief valve in starting of the engine and operates in such a manner that the fuel pressure in the passage becomes a target value, the control section determining whether the relief valve has a defect based on the difference between an actual fuel pressure and the target value, wherein the determination by the control section involves the use of an average of the fuel pressure in a certain duration of a period in which the fuel pressure, as the actual fuel pressure, is adjusted to become a constant target value.

8. The diagnosis device according to claim 7, wherein the certain duration is a period after the period from when the engine is started to when a predetermined time elapses.

9. The diagnosis device according to claim 8, wherein the predetermined time is equal to or slightly longer than a period in which the fuel pressure greatly changes after starting of the engine.

10. The diagnosis device according to claim 8, wherein the certain duration is a period from when the predetermined time elapses to when adjustment of the fuel pressure to the target value is ended.

11. The diagnosis device according to claim 7, wherein an electronic control unit determines that the relief valve has a defect if the difference between the actual fuel pressure and the target value is greater than a predetermined determination value.

12. The diagnosis device according to claim 11, wherein the predetermined determination value is greater than the difference between the fuel pressure and the target value at the time when the relief valve closes in response to the closing instruction, and is smaller than the difference between the fuel pressure and the target value at the time when the relief valve does not close in spite of the closing instruction.

13. A diagnosis method for an electromagnetic relief valve, the method comprising:

supplying fuel to a fuel injection valve of an internal combustion engine through a high-pressure fuel passage;

causing the electromagnetic relief valve to release the fuel from the passage in response to an opening instruction so as to lower a fuel pressure in the passage;

outputting the opening instruction to the relief valve in response to a stopping instruction for stopping the engine; and determining whether the relief valve has a defect based on a change amount of the fuel pressure before and after the relief valve is actuated in response to the opening instruction.

14. A diagnosis method for an electromagnetic relief valve, the method comprising:

supplying fuel to a fuel injection valve of an internal combustion engine through a high-pressure fuel passage;

causing the electromagnetic relief valve to release the fuel through the passage in response to an opening instruction so as to lower a fuel pressure in the passage;

causing the relief valve to stop releasing the fuel in response to a closing instruction;

outputting the closing instruction to the relief valve in starting of the engine and performing control for adjusting the fuel pressure in the passage to a target value;

determining whether the relief valve has a defect based on the difference between an actual fuel pressure and the target value; and using an average of the fuel pressure in a certain duration of a period in which the fuel pressure, as the actual fuel pressure, is adjusted to become a constant target value in the determination.

* * * * *